United States Patent Office 3,559,138
Patented Jan. 26, 1971

3,559,138
CURRENT LIMITING DEVICE
Toshio Itoh, Toshio Miyamoto, and Yuichi Wada, Amagasaki, Japan, assignors to Mitsubishi Denki Kabushiki Kaisha, Tokyo, Japan
Filed July 29, 1969, Ser. No. 845,861
Claims priority, application Japan, Aug. 1, 1968,
43/54,563
Int. Cl. H01h 85/06
U.S. Cl. 337—21
2 Claims

ABSTRACT OF THE DISCLOSURE

Within a tubular envelope closed at one end an electrode is supported by another electrode through a solid insulation and electrically connected to the latter electrode through a current limiting material filling a hole extending through the insulation. An annular screw engages the other end of the envelope to retain the protrusion. Alternatively the above-mentioned envelope may be formed of the latter electrode and provided with a flange for retaining the protrusion.

CROSS REFERENCE TO RELATED APPLICATIONS

Reference is made to the following copending applications:

U.S. application Ser. No. 708,048, entitled Current Limiting Equipment, filed by Toshio Ito, Toshio Miyamoto, Yutaka Murai and Yuichi Wada on Feb. 26, 1968, now Pat. No. 3,501,730, and assigned to the same assignee as the present application.

U.S. application Ser. No. 708,406, entitled Current Limiting Circuit, filed by Toshio Ito, Toshio Miyamoto, Yutaka Murai and Yuichi Wada on Feb. 26, 1968, and assigned to the same assignee as the present application.

U.S. application Ser. No. 708,653, entitled Current Limiting Device, filed by Toshio Ito, Toshio Miyamoto and Yuichi Wada, now Pat. No. 3,488,761, and assigned to the same assignee as the present application.

BACKGROUND OF THE INVENTION

This invention relates to improvements in a current limiting device of the type using a current limiting material having the self-restoring property.

There have been previously proposed various current limiting devices of the type referred to. For example, the above cited copending U.S. application Ser. No. 708,048 describes and claims a current limiting equipment including pressure buffer means for preventing a pressure within the device from excessively rising upon vaporizing a current limiting material involved due to a flow of overcurrent therethrough. The above cited copending U.S. application Ser. No. 708,406 discloses and claims a current limiting circuit comprising a current limiting device of the type referred to and an ordinary switch connected in parallel circuit relationship to the current limiting device and permitting a flow of normal stationary current therethrough in order to allow a high current to readily flow through the circuit in response to an increase in capability of the associated circuitry and also to select, at will, a time point at which the current limiting operation is started by controlling a time point at which the parallel switch is brought into its open position, and if desired, in order to effect selective interruption for current limiting purpose. Further the above cited copending U.S. application Ser. No. 708,653 describes and claims a current limiting device including a housing filled with a current limiting material and having at least one portion formed of an electrically resisting material disposed in parallel circuit relationship with the current limiting material for the purpose of suppressing any extraordinary voltage that may be developed across the device during the current limiting operation.

With all the measures as above described, a flow of overcurrent through the particular current limiting material causes the material to vaporize to put the associated device in its interrupting state. After a predetermined interval of time the vaporized material is cooled to be liquidized or solidified as the case may be to restore the device to the original conducting state. The vaporization of the current limiting material also causes the generation of a very high pressure in that space occupied by the material leading to a fear that the positional relationship between a pair of electrodes involved may vary. In an extreme case, one of the electrodes may slip out of the device.

SUMMARY OF THE INVENTION

Accordingly it is the primary object of the invention to provide a new and improved current limiting device responsive to a flow of overcurrent therethrough to be put in its interrupting state through the vaporization of a current limiting material involved and restored to its conducting state after a predetermined interval of time.

It is another object of the invention to provide a new and improved current limiting device ensuring that a pair of electrodes involved remain unchanged upon vaporizing the associated current limiting material in response to a flow of overcurrent therethrough.

The invention accomplishes the above cited objects by the provision of a current limiting device comprising, in combination, a first electrode and a second electrode disposed in opposite relationship, the first electrode including a radial protrusion, a solid body of electrically insulating material interposed between the first and second electrodes to cause the second electrode to support the first electrode in electrically insulated relationship, an amount of current limiting material filling a void extending through the insulating solid body to electrically connect the first electrode to the second electrode, an envelope having the first and second electrodes and the insulating solid body accomodated therein, and a retaining member disposed on the envelope to be operatively coupled to the radial protrusion of the first electrode.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENTS

Figure 1:
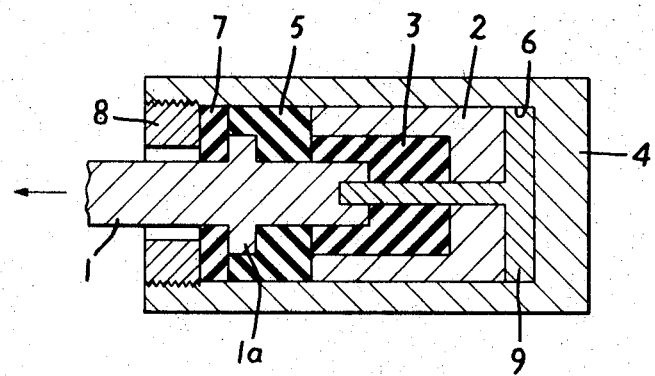
FIG. 1 is a longitudinal sectional view of a current limiting device constructed in accordance with the principles of the invention.

Referring now to the drawing and FIG. 1 in particular, it is seen that an arrangement disclosed herein comprises a first metallic electrode 1 in the form of a rod having a radial protrusion 1a extending therefrom near to one end thereof, a second metallic electrode 2 in the form of a cup disposed in spaced opposite relationship with the first electrode 1 with the first electrode partly extending into the "cup" through the open mouth thereof. A solid body 3 of any suitable electrically insulating material fills a space formed between the first and second electrodes 1 and 2 respectively to connect them into a unitary structure. The insulating solid body may be preferably of a mixture of powdered mica and powered glass molded at a high temperature and under a high pressure into the desired shape. The unitary structure of the electrodes and insulating solid body 1-2-3 is snugly fitted into an electrically conductive envelope 4 in the form of a hollow cylinder closed at one end with a relatively narrow gap formed between the closed end face of the envelope 4 and the bottom face of the second electrode 2. The envelope 4 has its inner peripheral surface put in intimate contact with the outer peripheral surface of the second electrode 2 and serves as an external electrical connection to the second electrode. On the other hand the first electrode 1 projects beyond the open end of the envelope 4 and is spaced away from the envelope by any suitable electrical insulation 5 into which the radial protrusion 1a of the electrode 1 is at least partly embedded.

As shown in FIG. 1, a void 6 in the form of a hole or a channel extends through both the insulating solid insulation 3 and the second electrode 2 to communicate at one end with the above mentioned gap between the second electrode and envelope 2 and 4 respectively. The void has the other end portion shortly extending into the first electrode 1. The void and gap as above described is filled with an amount of any suitable current limiting material 9 with a self-restoring property. The current limiting material is in liquid or solid state and electrically conductive at room temperature. However, when heated it vaporizes to become electrically nonconductive. When the vaporized material is cooled it is restored to its original liquid or solid state as the case may be to become conductive as described in the cited applications, suitable examples of the current limiting material involve sodium (Na), potassic sodium (Nak), potassium (K), gallium (Ga), iron-cobalt alloys, silver (Ag), etc.

Any suitable electrical insulation 7 in the form of an annulus is closely fitted into the envelope 4 and also onto the first electrode 1 until it abuts against the radial protrusion 1a of the first electrode 1. Then an externally threaded annulus 8 is put in engagement with the internally threaded end portion of the envelope 4 until it abuts against the insulation 7. The threaded annulus 8 has its inner periphery spaced away from the adjacent portion of the first electrode 1 and serves to lock the latter in place within the envelope 4.

In the normal mode of operation, a current flows through a circuit traced from the first electrode 1 through the current limiting material 9 and the second electrode 2 and thence to the envelope 4. However, if an overcurrent flows through the circuit just described then the current limiting material 9 is vaporized to electrically insulate the first electrode 1 from the second electrode 2. After the first electrode 1 has been maintained electrically insulated from the second electrode 2 for a predetermined interval of time, the vaporized material 9 is cooled to be again liquidized or solidified to electrically connect the first electrode 1 to the second electrode 2.

With the current limiting material 9 vaporized, the first electrode 1 is applied with a pressure in the direction of the arrow shown in FIG. 1 to tend to slip out of the insulating body 3. However, the threaded annulus 8 retains the radial protrusion 1a of the first electrode 1 through the annular insulation 7 thereby to prevent the first electrode 1 from tending to disengage from the insulating solid body 3.

If desired, a conductive lead (not shown) may be connected directly to the second electrode 2 while the envelope 4 may be formed of any suitable electrically insulating material well known.

Figure 2:
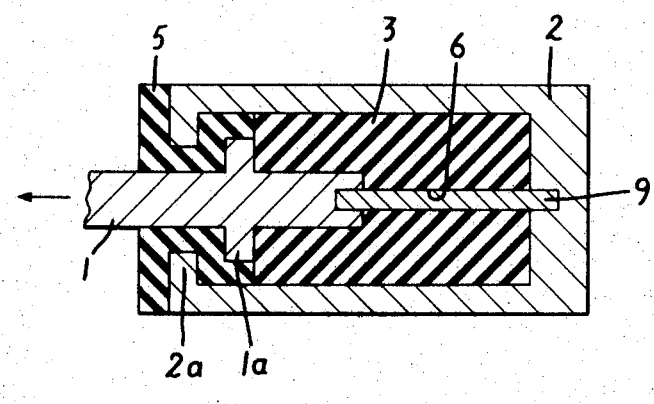
FIG. 2 is a view similar to FIG. 1 but illustrating a modification of the invention.

FIG. 2 shows a modification of the invention wherein the second electrode 2 as shown in FIG. 1 serves as the envelope while the envelope electrode and threaded annulus 2 and 8 respectively shown in FIG. 1 are omitted. The second electrode 2 as shown in FIG. 2 has an internally directed flange 2a dsposed at the open end and embedded into the insulation 5. In other respects the arrangement is substantially similar to that illustrated in FIG. 1 and therefore like reference numerals designate the components similar or corresponding to those shown in FIG. 1.

In FIG. 2, the flange 2a engages the radial protrusion 1a of the first electrode 1 through that portion of the insulation 5 disposed therebetween thereby to provide a retaining member to prevent the first eletrode 1 from tending to disengage from the insulating solid body 3 upon vaporizing the current limiting material 5.

From the foregoing it will be appreciated that the objects of the invention have been accomplished by disposing the radial protrusion 1a on the first electrode 1 and operatively coupling the radial protrusion to either the threaded annulus 8 screw threaded into the envelope 4 or the internally directed flange 2a of the second electrode 2 also providing an envelope.

What we claim is:

1. A current limiting device comprising, in combination, a first electrode and second electrode disposed in opposite relationship, said first electrode including a radial protrusion, a solid body of electrically insulating material interposed between said first and second electrodes to cause the second electrode to support the first electrode in electrically insulated relationship, an amount of current limiting material filling a void extending through said insulating solid body to electrically connect the first electrode to the second electrode, an envelope having said first and second electrodes and said insulating solid body accommodated therein, and a retaining member disposed on said envelope to be operatively coupled to said radial protrusion of said first electrode.

2. A current limiting device comprising in combination, a first electrode including a radial protrusion, a second electrode having said first electrode accommodated therein, a solid body of electrically insulating material interposed between said first and second electrodes to cause the second electrode to support the first electrode in electrically insulated relationship, an amount of current limiting material filling a void extending through said insulating solid body to electrically connect the first electrode to the second electrode, and a retaining member disposed on said envelope to be operatively coupled to said radial protrusion of said first electrode.

References Cited

UNITED STATES PATENTS

| 3,501,730 | 3/1970 | Ito et al. | 337—159 |
| 3,281,559 | 10/1966 | Ebensteiner | 337—403 |
| 2,505,193 | 4/1950 | Loporto | 337—119 |
| 2,087,905 | 7/1937 | French | 337—119 |

BERNARD A. GILHEANY, Primary Examiner

D. M. MORGAN, Assistant Examiner

U.S. Cl. X.R.

337—159, 290